(12) United States Patent
Batra et al.

(10) Patent No.: US 7,685,131 B2
(45) Date of Patent: Mar. 23, 2010

(54) WEB SERVICES DATABASE CLUSTER ARCHITECTURE

(75) Inventors: Vishal Singh Batra, Uttar Pradesh (IN); Wen-Syan Li, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 11/364,710

(22) Filed: Feb. 28, 2006

(65) Prior Publication Data

US 2007/0203944 A1 Aug. 30, 2007

(51) Int. Cl.
G06F 7/00 (2006.01)
G06F 17/30 (2006.01)
G06F 12/00 (2006.01)

(52) U.S. Cl. .............................. 707/10; 707/3; 707/200
(58) Field of Classification Search ..................... 707/8; 711/145; 709/220
See application file for complete search history.

(56) References Cited

U.S. PATENT DOCUMENTS

| | | | |
|---|---|---|---|
| 6,023,720 A | 2/2000 | Aref et al. | |
| 6,523,036 B1 | 2/2003 | Hickman et al. | |
| 6,564,252 B1 | 5/2003 | Hickman et al. | |
| 6,681,232 B1 * | 1/2004 | Sistanizadeh et al. | 707/104.1 |
| 6,829,610 B1 | 12/2004 | Hickman et al. | |
| 6,918,013 B2 * | 7/2005 | Jacobs et al. | 711/145 |
| 7,086,065 B1 * | 8/2006 | Yeluripati et al. | 719/311 |
| 7,200,681 B1 * | 4/2007 | Lewin et al. | 709/246 |
| 2001/0034752 A1 | 10/2001 | Kremien | |
| 2002/0002602 A1 | 1/2002 | Vange et al. | |
| 2002/0188753 A1 | 12/2002 | Tang et al. | |
| 2003/0037150 A1 | 2/2003 | Nakagawa | |
| 2003/0105757 A1 | 6/2003 | Mangrola | |
| 2003/0105837 A1 * | 6/2003 | Kamen et al. | 709/220 |
| 2004/0025079 A1 | 2/2004 | Srinivasan et al. | |
| 2004/0078782 A1 * | 4/2004 | Clement et al. | 717/116 |
| 2004/0098490 A1 | 5/2004 | Dinker et al. | |

(Continued)

OTHER PUBLICATIONS

Li Vecchi; et al., "*Shared Cipher Spec Protocol*", IBM Research Disclosure No. 432, Apr. 2000, Article 173, p. 776.

(Continued)

*Primary Examiner*—Apu M Mofiz
*Assistant Examiner*—Susan Y Chen
(74) *Attorney, Agent, or Firm*—Gibb I.P. Law Firm, LLC (57) ABSTRACT

There is disclosed configuring of clustered web services nodes accessing a common database, including implementing a data virtualization layer at each node to abstract an instance of the database from a web service application. In one embodiment, at each node is performed creating a first, data virtualization entity bean having all read and write operations of an application-developed (master) entity bean, creating a second entity bean that carries only the read operations of the master entity bean and addresses the replica instance, receiving an operation request at the first entity bean, and routing a request to either the master entity bean or the second entity bean depending upon the requested operation to access the respective database instance. In another embodiment, at each node is performed implementing an empty database instance having a schema matching the common database, identifying a relevant partitioning in a query utilizing the empty database, and routing the query to a respective partitioned database instance.

3 Claims, 6 Drawing Sheets

U.S. PATENT DOCUMENTS

| | | |
|---|---|---|
| 2004/0162901 A1 | 8/2004 | Mangipudi et al. |
| 2004/0194066 A1* | 9/2004 | Frey et al. .................. 717/127 |
| 2004/0257985 A1 | 12/2004 | Sahai et al. |
| 2005/0005018 A1 | 1/2005 | Datta |
| 2005/0048983 A1 | 3/2005 | Abraham et al. |
| 2006/0106856 A1* | 5/2006 | Bermender et al. ......... 707/102 |
| 2007/0150505 A1* | 6/2007 | Chaushev ................... 707/102 |

OTHER PUBLICATIONS

Thubert; et al., *"Session sharing in a cluster of Java Servers"*, RD No. 430, Feb. 2000, Article 142, p. 355.

* cited by examiner

WEB SERVICES DATABASE CLUSTER ARCHITECTURE

FIELD OF THE INVENTION

This invention relates web services utilizing database clusters, such as enable e-commerce.

BACKGROUND

E-commerce is becoming more and more a part of everyday life. Purchase enquiries and purchase orders for goods and services are made over electronic networks, most usually in the public internet. The high volume e-commerce applications demand an infrastructure to offer high availability, guaranteed quality of service (QoS) and response time with load balancing, fault tolerance and stability for high availability. Such systems are deployed over a cluster where the cluster nodes host application server (and application) and database instances (master database instance and replicas) to share the workload and provide high availability and improved response time.

One known approach for implementing e-commerce applications is J2EE (Java 2 Platform, Enterprise Edition, published by Sun Microsystems, Inc). J2EE is a set of coordinated specifications and practices that together enable software solutions for developing, deploying, and managing multi-tier server-centric applications. J2EE is also a platform for building and using web services.

The primary technologies in the J2EE platform are: Java API for XML-Based RPC (JAX-RPC), JavaServer Pages, Java Servlets, Enterprise JavaBeans components, J2EE Connector Architecture, J2EE Management Model, J2EE Deployment API, Java Management Extensions (JMX), J2EE Authorization Contract for Containers, Java API for XML Registries (JAXR), Java Message Service (JMS), Java Naming and Directory Interface (JNDI), Java Transaction API (JTA), CORBA, and JDBC data access API.

Figure 1:
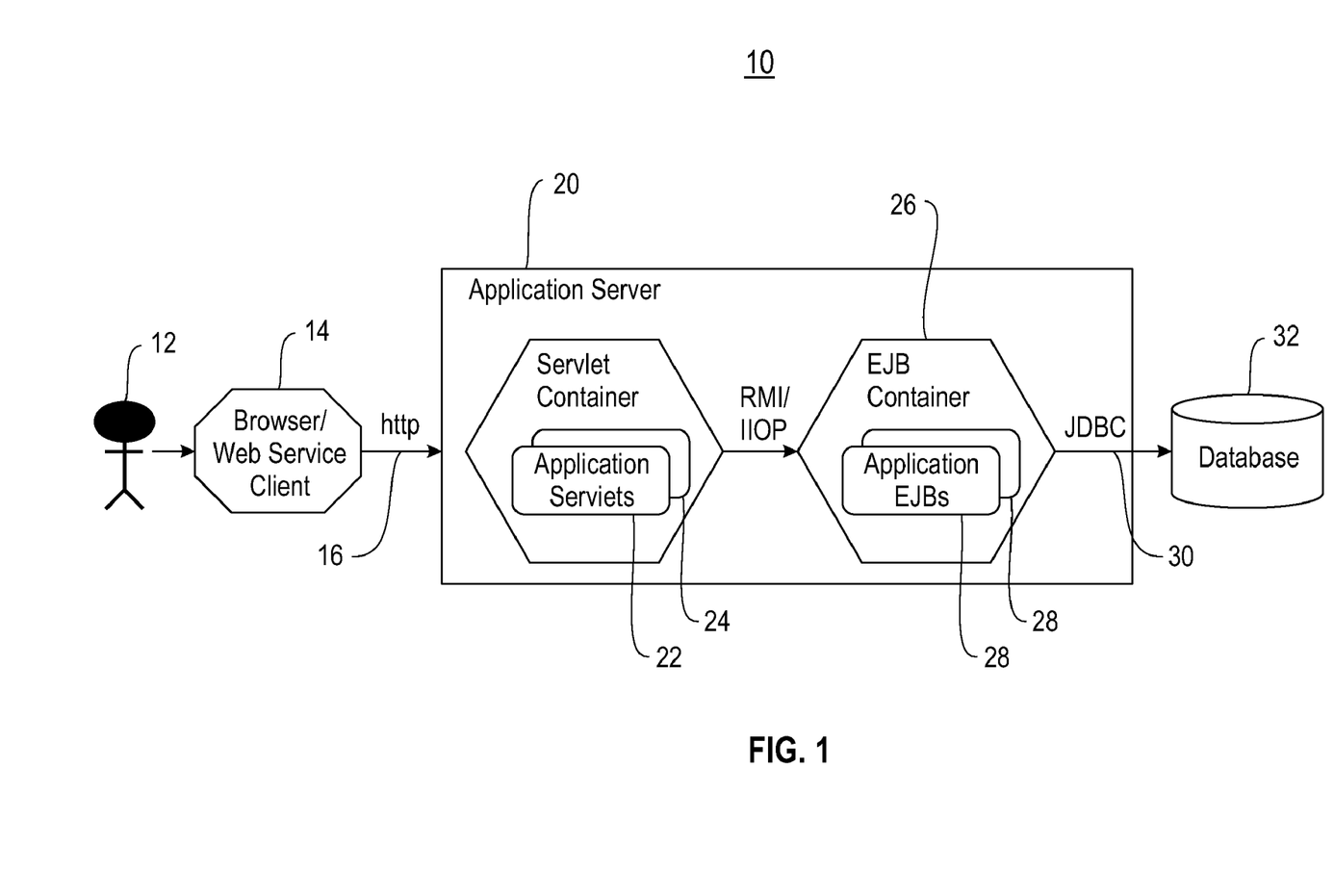
FIG. 1 is a schematic block diagram of a multi-tiered architecture for deploying a web application.

A known e-commerce architecture has a tiered development and deployment approach for the application. The different tiers of an e-commerce application are (i) view or user interface tier, (ii) controller or application logic tier, and (iii) model or application's persistent data model tier. These tiers, known as MVC (i.e. model, view, and controller) architecture, are deployed over web, application and database servers respectively. As shown in FIG. 1, a MVC architecture 10 has a human actor 12 who interacts with a web service client computer 14. The client computer 14 runs a browser application (that is a client to a J2EE program that invokes the web service), and interacts application servers over a public network 16, such as the internet, using a suitable (i.e. http/https) protocol. An application server 18, deploying J2EE applications, has a servlet container 20 within which resides multiple application Java servlets 22. The container 20 implements J2EE servlet specifications and executes the servlets 22 in runtime. The output 24 of the servlet container 20 is RMI/IIOP (i.e. RMI over IIOP) invocation, passed to an Entity/Enterprise Java Bean (EJB) container 26. The EJB container 26 has multiple application EJBs 28. The output 30 from the EJB container 26 is a JDBC API, which makes read/write calls on a database 32.

Figure 2:
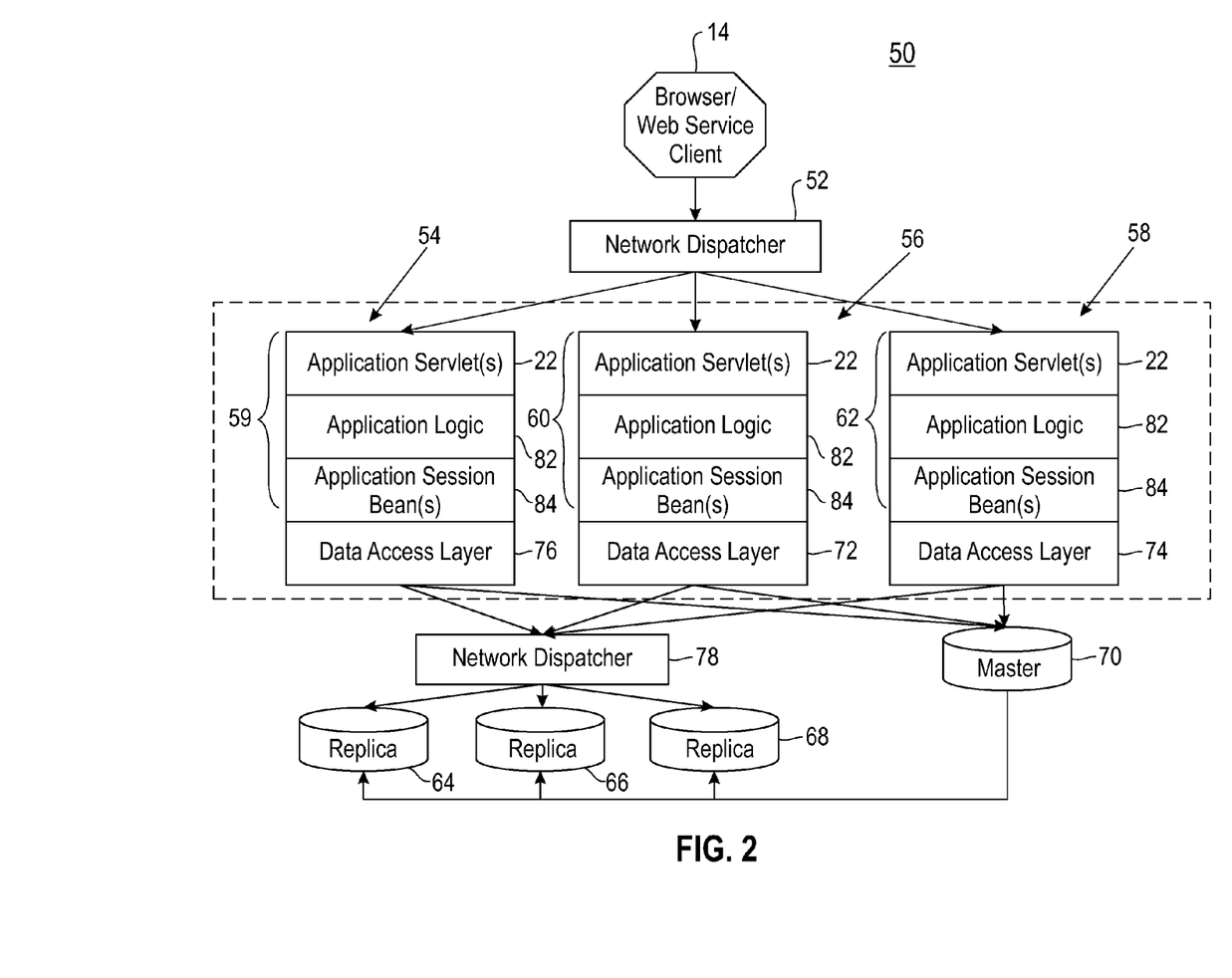
FIG. 2 is a schematic block diagram of a cluster architecture having replicated databases for deploying a web application.

One approach to deploy a multi-tiered architecture is to cluster web, application and database tier to improve the end-to-end application performance. As shown in FIG. 2, an architecture 50 includes the web service client 14, in communication with a network dispatcher program 52. A cluster of nodes 54-58 host multiple application servers 59-62 and database instances 64-68. The dispatcher program 52 distributes requests equally to the nodes 54-58. The database instances 64-68 are replicated across several nodes to get performance benefit and higher availability in case of database failures. The network dispatcher 52 (or Virtual IP) abstracts the client application 14 from the cluster and provide a single interface to interact with the cluster of nodes 54-58.

Turning then to the application servers 59-62. The Application Servlets 22 have the same function as described above. Each of the Application Logic 82 is set of Java classes that house the business logic that the application uses to fulfil client requests. The business logic could be anything; for example: validate the data sent by the client 12 to persist in the database 70. The Application Session Beans 84 are Enterprise Java Beans (EJB) as explained above. Session beans are Java components that house application logic requiring 'ACID' support. ACID stands for: Atomicity, Consistency, Isolation, and Durability. The J2EE container (such as the IBM WebSphere Application Server and the BEA Weblogic Application server) offers ACID support to the Session Beans 84.

The data access layers 72-76 are deployed to replace Entity Beans, and to access the database directly. A network dispatcher 78 is deployed with the same principles as explained above with reference to the dispatcher 52, to route database requests to one of the database nodes in the replica cluster 64-68.

Read operations are routed to the replica database instances 64-68 and the updates, inserts and deletes are routed to a master database 70 by the respective data access layer 72-76 and the network dispatcher 78. If the application demands a read following an immediate write, the data access layer 72-76 has to be either stateful between transactions to route such a query to the master or it provides stale data to the application by routing the query to the replica. The replication infrastructure works independently in the background and is not integrated with the data access layer to notify as and when it completes the replications jobs. This makes the data access layer 72-76 less smart, as it continues to forward all the queries following the insert/delete/update to the master 70 even if the data is being replicated to the replicas, and thereby under-utilizing the resources of the cluster.

Figure 3:
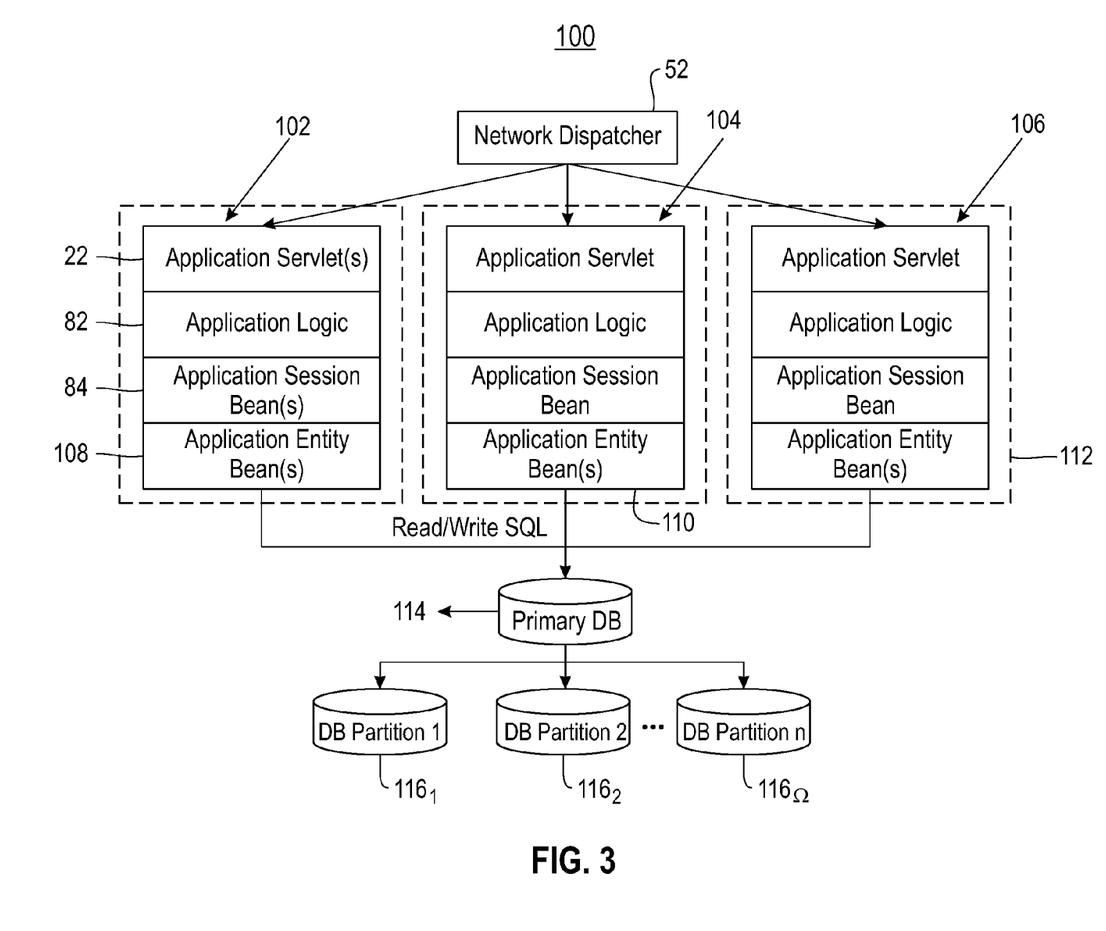
FIG. 3 is a schematic block diagram of a cluster architecture having partitioned databases for deploying a web application.

Another approach—suited to applications that have a very large database—is to implement the database as a master and partition topology. As shown in FIG. 3, an architecture 100 once again has a network dispatcher 52. Each application server 102-106 has application servlets, application logic and application session bean(s) in common with the servers 58-62 of FIG. 2. However, an application entity bean(s) layer 108-112 replaces the data access layer 72-76. A primary database instance 114 exists and responds to read/write requests from the respective application entity bean(s) 108-112. Additionally, the primary database instance 114 exists as discrete partitions 116. The primary database instance 114 has knowledge of the partitioned database instances in the cluster and also maintains the information on how the data is partitioned and which node in the partition carry what part of the data. This information is used to build the index at the primary db. Once a query is submitted, the primary database 114:

i) analyzes the query,
ii) splits it in various parts to match the data partitions,
iii) routes the individual parts to the partitioned database nodes $116_n$,
iv) gathers results from each of the partitions involved in the query execution,
v) perform database operation(s) on the result collection that can not be performed by the underneath partitions individually as the operation requires a complete view of the results from all the partitions, vi) compose the final result set, and vii) answers the query to the client The partitioned databases $116_n$ are database instances that carry the part of the database 114. For example, a large table T could be partitioned in two database instances such that the first database carries first half of the rows (tuples) of that table and the second database carries the second half. A database partitioning can also be achieved by placing different tables at different database servers. For example, Table T1 is placed at server S1 and T2 at server S2.

However, there are following limitations in deploying distributed systems over such solutions:

1. The deployment of the data partitions is very specific to the database vendor and product. The data partition deployment and query routing logic is not an industry standard and that makes the application tightly coupled with the database product and vendor.
2. The database products providing data partitioning may need extra database administration as the solution is an extension to the standard database technology.
3. The single database instance acting as the primary interface to the partitioned datasets abstracts partitioned database instances; however, it acts as an intermediate query stop point before the query is routed to the partitioned node carrying the data relevant to the query. This makes the application first connect to the primary database instance and then the primary database instance connects to the secondary instance making the system less efficient in certain situations as discussed later in the section.
4. There exist smart techniques to deploy the primary instance and the partition instances to offer fault tolerance. However if the solution is designed and deployed to have a single primary instance as single point of interface to the database system, the risk of database failure increases due to single point of failure of the primary instance.

The primary instance analyzes the query to check which data partition the query can be contained and if there is a single data partition, the primary instance routes full query to the partition. If there are multiple partitions involved to contain the query, the primary instance splits the query in parts that can be routed to individual partitions and, if required, takes the responsibility to process the results from each partitions (such as a join operation) before sending the result back to the application.

If the query workload and the data are well analyzed to partition the data, there shall be fewer instances where the query spans multiple data partitions. In OLTP applications, the queries are less complex and in most of the cases they are answered by the single partition. It will be therefore more efficient for such applications to be able to route the query directly to the partition compared to routing the query to the primary instance and then getting it routed to the partition. However, the enterprise system enabling such direct routing should also support other features of the primary database instance such as splitting the queries for different partitions and joining their results back in a way that is transparent to the application and can be adopted as an industry standard to enable enterprise system vendors to incorporate the solution in the framework. The lack of support to the above makes J2EE applications tightly coupled with the database vendor or has to encapsulate data partition logic within the application tier, both making application portability complex. This drives a need for Enterprise Systems, such as J2EE frameworks, to enable application deployment over partitioned databases in a transparent and loosely coupled way.

The invention is directed to overcoming or at least reducing one or more of these problems.

SUMMARY

The invention is directed to improving scalability, performance, availability and reliability, and to offer quality of service in the deployment of database clusters, particularly in e-commerce applications. There thus is disclosed configuring of clustered web services nodes accessing a common database, including implementing a data virtualization layer at each node to abstract an instance of the database from a web service application.

In one embodiment, web services operations are performed on a set of nodes accessing a common database. The database is arranged as a master instance addressed by a master entity bean and at least one replica instance. At each node is performed creating a first, data virtualization entity bean having all read and write operations of the master entity bean, creating a second entity bean that carries only the read operations of the master entity bean and addresses said replica instance, receiving an operation request at the first entity bean, and routing a request to either the master entity bean or the second entity bean depending upon the requested operation to access the respective database instance.

In another embodiment, web services are performed on a set of nodes accessing a common database. The database is arranged as discrete non-overlapping partitioned instances. At each node is performed implementing an empty database instance having a schema matching said common database, identifying a relevant partitioning in a query utilizing the empty database, and routing the query to a respective partitioned database instance.

Corresponding web services servers and computer program products are also disclosed.

DETAILED DESCRIPTION

Overview

A data virtualization layer is developed to abstract the physical database instance with the application. The virtualization layer houses the data management and query routing logic and moves the data access logic from the application code to the middleware hosting the application (such as Application Servers).

The preferred J2EE technology used for the development of the web application is extended to offer scalable deployment of the database layer. The application layer, deployed in Application Servers (such as IBM WebSphere and BEA Weblogic Application Servers), are clustered to load balance a web transaction, however, the database layerr can not be clustered using the existing J2EE technology. The data object or the Entity beans deployed in the J2EE architecture are by design, attached to a single database instance, leaving little choice to cluster the database instance by either creating the replicas or horizontally partitioned database cluster. The data visualization layer allows this to occur.

Depending on the class of the application, either the 'replicated database' and 'partitioned database' approach will be selected to improve the data availability, scalability and performance. There are various class of e-commerce application such as a) Data Read Intensive b) Data Read-Write Intensive and c) Data Write Intensive. The 'replicated database' solution targets Data Read Intensive applications, and the 'partitioned database' solution targets the other two: Read-Write Intensive and Write Intensive.

The example of J2EE will be used in describing embodiments hereinafter.

Replicated Database

The replicated database solution is achieved by creating two clones of the Entity Bean. Entity Bean is an Object Oriented View of the data (table) and typically represents a single tuple from the table it points to. The cloned Entity Beans are then deployed in such a way that one of the cloned beans (RWBean) offers data virtualization and abstracts the physical location of the data from the application. The other cloned bean (ReadBean) is deployed against the replicated database. The original (primary) entity bean still continues to point to the primary database. The data virtualizer entity bean is deployed using the attributes (JNDI Name) of the primary bean, and therefore the application transparently starts invoking data virtualizer entity bean and not the primary entity bean. Doing this, the data virtualizer entity bean has control to load-balance (route) the query either to the primary database or its replica by delegating the request either to the primary entity bean or the cloned (Read) entity bean.

Figure 4:
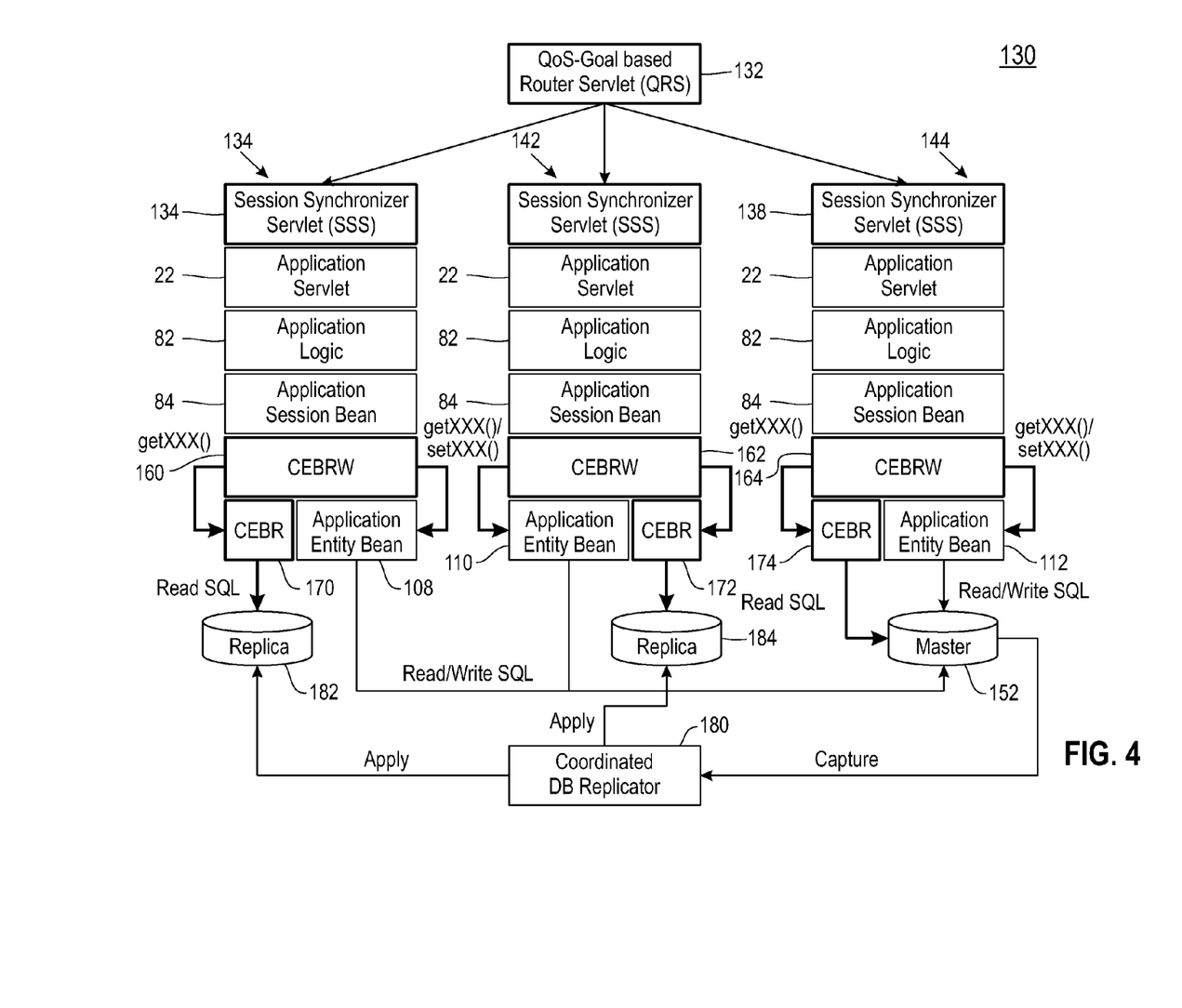
FIG. 4 is a schematic block diagram of a cluster architecture having replicated databases for deploying a web application embodying the invention.

Referring now to FIG. 4, it is noted that those integers in common with the arrangement shown in FIG. 2 will not be described again. In an architecture 130, the Network Dispatcher 52 of FIG. 2 is replaced with a QoS-Goal based Router Servlet (QRS) 132. The QRS 132 is the entry point to the cluster of nodes 140-144 and it monitors the performance of each node for the given service class. The QRS 132 records the performance in the background, and uses the results to route the subsequent requests based on their QoS goals and the performance of each node as observed in the previous runs. The QRS 132 also monitors the database state change with the help of a CEBRW (as described below), and if the database state is changed, it sets an additional request parameter when passing the request to a SSS (see below) to notify the database state change to the SSS. The SSS sets the flag in the thread name to enable all tiers below it about the same.

A new component 'Session Synchronizer Servlet' (SSS) 134-138 is deployed with each respective node 140-144 housing the web and application logic. Each SSS 134-138 is responsible to synchronize the user session among the cluster nodes 140-144. As different requests from the user can be served on different nodes of the cluster, depending on the request QoS goal and QoS offered by the nodes in the cluster, the SSS 134-138 synchronizes the user session at the node when the request is routed to the same. The SSS 134-138 updates the user session when the request arrives the selected node 140-144 in the cluster. The SSS 134-138 is the first component to receive the request on the respective node 140-144 and is configured as the first servlet, using the servlet chain configuration property of the application server. After the SSS 134-138 updates the user session, the request is forwarded to the respective application servlet 22 by the servlet container. The application server will automatically invoke the SSS 134-138 before passing the request to the application servlets 22. Once the processing is complete by the application servlets 22, the SSS 134-138 reads back the user session and persist it at a common (master) database 152 that is accessible to all SSS 134-138 deployed on all nodes 140-144 of the cluster. A unique identifier is assigned to each user session by the QRS 132 and the same is used to persist the user session on the common database 152. The user session identifier is kept in the session of the QRS 132 and is passed to the SSS 134-138 as part of the request URI between the QRS 132 and the SSS 134-138. When the request arrives, the SSS 134-138 reads the user session from the common database 152 and sets the current session attributes with the values from the session object read from the common database 152.

The deployment of the data objects or the Entity Bean is re-engineered. An Entity Bean carries read (getXXX( )) and write (setXXX( )) and delete (remove( )) operations to transact with the database and manage the persistent data. An Entity Bean is deployed in the J2EE container which is part of the Application server. The deployment of the container manager entity beans is re-engineered to enable integration with the master and replica database instances in a way that is transparent to the application. This is done by:

(a) Cloning the entity bean (CEBRW) with all the read and write operations and implement both home and remote interface of the master entity bean. However, as described below, the logic of the read and write operations of the cloned bean are different from the master entity bean.

(b) Creating a new entity bean with its home and remote interface that carries only the read operations of the master entity bean. This bean is called CEBR as it is clone of the read operations of the master entity bean unlike CEBRW which is clone of both read and write operations of the master entity bean.

The CEBRW 160-164 and the CEBR 170-174 can easily be developed at compile time (during ejbc or deployment phase), using the Java reflection API. The automation tool to generate code for the CEBRW 160-164 and CEBR 170-174 can also generate the code for the read and write operations of the CEBRW. The CEBRW 160-164 is deployed with 'Bean Managed Persistence' (BMP) option and with the JNDI name of the master entity bean. The CEBR 170-174 is deployed with 'Container Managed Persistence' (CMP) option and against the database replica. The master entity bean is deployed as CMP against the master database and a new JNDI name. The write operations (setXXX( )) of the CEBRW 160-164 delegate the request to the write operations of the master entity bean. The read (getXXX( )) operations of the CEBRW 160-164 delegates the request to the read operations of either the CEBR 170-174 or the read operations of the master entity bean depending on the conditions as described below.

As the CEBRW 160-164 is deployed using the JNDI name of the master entity bean, the application session bean interacts with the CEBRW 160-164 and not the master entity bean. This allows CEBRW 160-164 to intercept all the database requests, originating from the application, and route them between the master database instance 152 and the replica database instance 182-184. For example, the CEBRW 160-164 can route read operations to the replica by delegating the read request to the CEBR 170-174 and the write operations to the master database 152 by delegating the write request to the master entity bean. In cases where the application session bean makes a read request immediately following the write, the CEBRW 160-164 delegates the request to the read operation of the master entity bean (and not to the read operation of the CEBR 170-174) to offer the latest data to the application as the master entity bean is deployed against the master database. To identify if the read request is following the write request the CEBRW 160-164 sets a flag in the name of the current thread executing the request during the execution of its write operation. This flag is checked in the read operations of the CEBRW 160-164 and if the value of the flag is found set, the request is delegated to the read operation of the master entity bean. The database state change flag is also read by the SSS 134-138 by reading the thread name when the application processing completes. The SSS 134-138 adds this flag in the application response and passes the composite response to the QRS 132 to 'notify' the QRS 132 about the database state change. The QRS 132 always looks for this flag in the response from the SSS 134-138 to smartly route the subsequent requests from the user to the master node associated with the master database instance in the cluster to allow the application get the latest data from the database. The CEBRW 160-164 also sets the timestamp associated with the write operation in the thread name. The timestamp is also passed by the SSS 134-138 to the QRS 132 and is cached in the user session of QRS 132 to be used later to compare with the data replication timestamp and identify the stage until which the data is replicated on all the replicas.

The application is abstracted with the data persistence details using this method as it continues to interact with the original interface of the Entity Bean. The DB Replicator 180 replicates the master database 152 to the replicas incrementally and notifies the QRS 132 the timestamp until which the data is replicated on all the replica instances 182, 184. One of the critical tasks the DB Replicator 180 achieves is to provide same state of all the replica instance and timestamp until which the data is replicated. The QRS 132 compares the replication timestamp with the timestamp for the latest update for the given user and if it finds that the update timestamp is contained within the replication timestamp, it starts to make use of the replicas by routing the request to any node of the cluster as opposed to route the request to the master node bound with master database instance only. To enable data consistency, the QRS 132 stores the update timestamps in a database (not shown).

If stateful session beans are used in the application and the references for the same are cached in the web tier user session, the application program deployed in one node (eg. 140) may invoke the stateful session bean instance on the other node (eg. 142) as different requests from the user in the same session may switch nodes depending on the QoS goals. To avoid this, the QRS 132 can be configured with the use cases (or URL pattern) that initiate and utilize the stateful session beans. Once such a use case is invoked by the user, the QRS 132 caches (in the user session of the QRS 132) the node information it routes the request and uses the information to route all subsequent requests from the user to the same node. Similarly, the QRS 132 can also be configured with the use case (or URL pattern) that ends the session of the stateful session bean so that the QRS 132 may start routing the user requests to any cluster node following the request that terminates the stateful session bean.

Depending on the application scenario, the QRS 132 can be configured with following options to route the user requests following database state change to the master node in the cluster:

(a) User based partitioned data: If the application carries data that is partitioned across users and a database state change by a particular user affects his records only, the QRS 132 sets database state change flag only for requests from that user following the database state change. This enables the CEBRW 160 to route the database queries, from all the nodes, for the user to the master instance of the database. For example, the 'PayUtilityBill' request from the user will change the balance amount in her account and will not affect balance amount (or any other data) for other users.

(b) Un-partitioned data: If the application data is not partitioned across users and a database state change by a particular user request affects his records and the records of other users, the QRS 132 sets database state change flag for all requests from all users following the database state change. This enables the CEBRW 160 to route all the database queries, from all the nodes, for all the users to the master instance of the database. For example, the "InterAccountTransfer" request to transfer funds from one user account to the second will change the balance amount for both the users in the transaction.

The QRS 132 can be configured with the use cases (or URL pattern) and the way it updates the database state using the above defined options.

Figure 5:
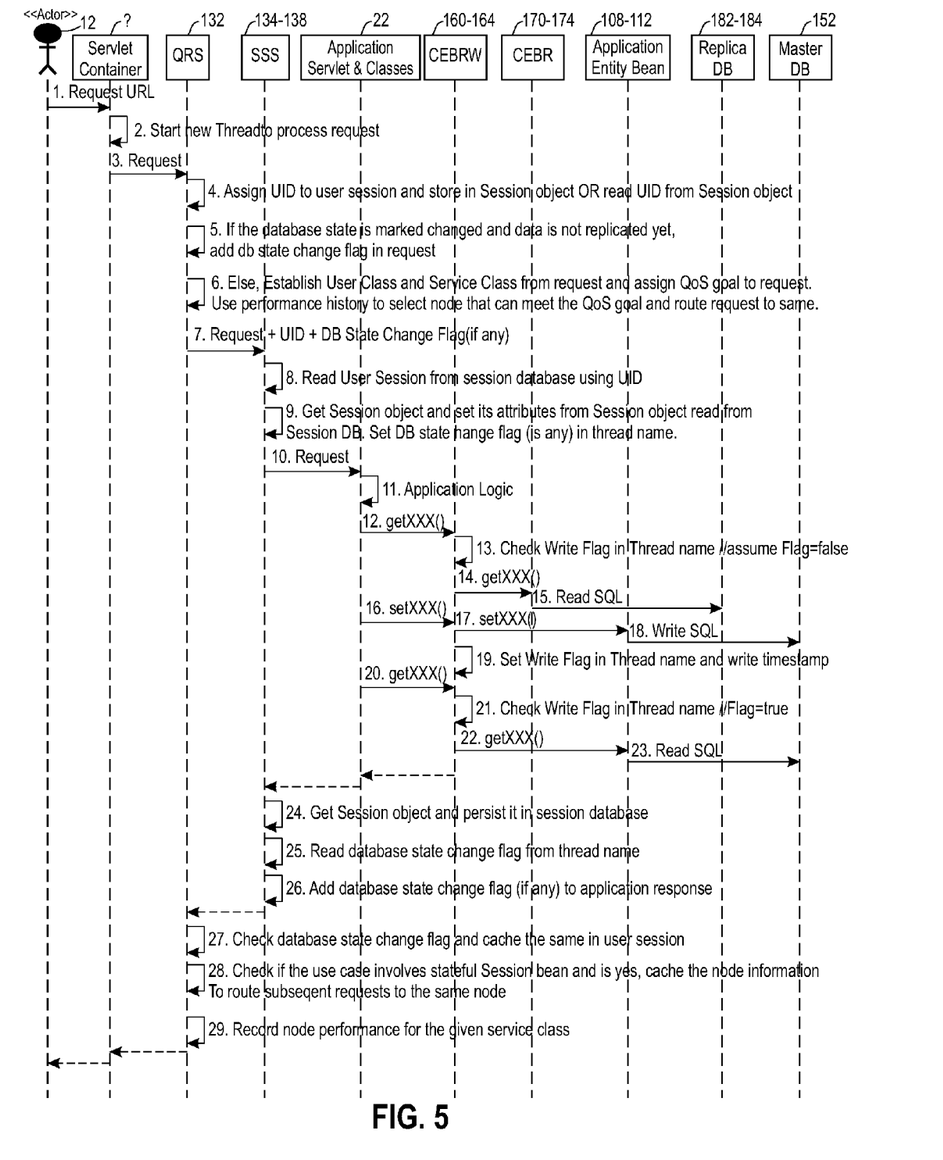
FIG. 5 is a sequence diagram for the embodiment of FIG. 4.

A complete sequence diagram, showing the flow of steps 1-29 relative to the architecture 130 of FIG. 4, is shown in FIG. 5.

The architecture 130 provides transparent support to deploy database cluster to the application in a way that is external to the application. The application transparently gets to work with the most recent data and never gets the stale copy of the data without building or embedding any logic in the application space.

The architecture 130 provides QoS based request dispatcher 132 to optimally utilize the available resources of the system.

The architecture 130 monitors the performance of each node for the given service class and uses the performance history to select the node for the given request and QoS goal. The architecture may also notify the system administrator about the nodes giving poor performance and needs tuning.

Partitioned Database

The partitioned database solution is achieved by creating a virtual database matching the primary database in IBM Cloudscape (http://www-306.ibm.com/software/data/cloudscape incorporated herein by reference). Cloudscape is a relational database engine library in Java that can be embedded in the JVM of the application (middleware server). The virtual database in Cloudscape consists of the table definition exactly similar to the tables in the physical database. The idea here is to intercept all queries originating from the application to the database in Cloudscape and route the query to correct partition(s) consisting the data required to answer the query.

To be able to route the query to the right partition, the Cloudscape database libraries have to be extended to understand the data partitions and use that information to decompose and route the query to the correct datasource. This functionality is not achieved by extending the JDBC driver because it is very much possible that a query might require to fetch data from more than one data partition and thereafter may require complex database operations such as Join, Sort etc to build the final resultset. Cloudscape database engine has the capability to decompose the query involving more than one table and database operations into Query Graph Model and execute individual part separately and finally integrate the data. The overhead involved by bringing this extra layer will not be large, as Cloudscape is a Java library and runs in the JVM of the application.

Figure 6:
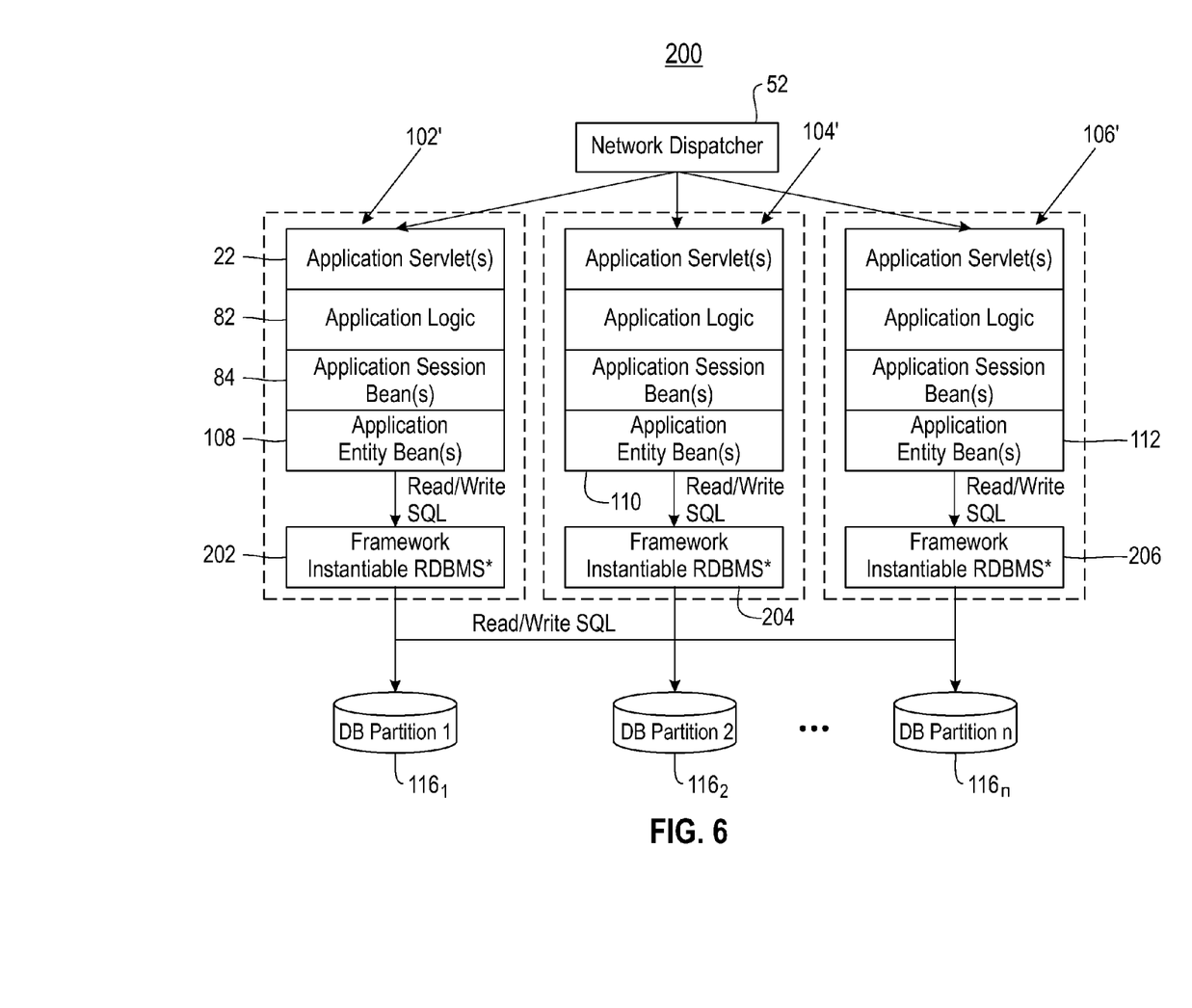
FIG. 6 is a schematic block diagram of a cluster architecture having partitioned databases for deploying a web application embodying the invention.

Referring now to FIG. 6, it is noted that those integers in common with the arrangement shown in FIG. 3 will not be described again.

To deploy J2EE applications against the partitioned database nodes, J2EE applications are deployed in an architecture 200 against framework embedded RDBMS (FE-RDBMS) 202-206 (eg. IBM Cloudscape).

A J2EE application is typically deployed against the relational databases, such as IBM's DB2™ and Oracle™, to house the application data and execute query against the same. The data objects or the entity beans of a J2EE application are coupled with the datasource definition which establishes communication channel with the under-lying database and acts as a driver to execute queries against the database system. In a typical J2EE application a datasource is defined for a RDBMS such as DB2™ and Oracle™ to provide a JDBC interface to the application to execute the queries. The physical location of the database is encapsulated in the datasource definition and is abstracted from the application for development and deployment portability. The application entity bean is configured with a datasource JNDI name (in the application deployment descriptor) using which the framework performs a JNDI lookup in runtime to get the datasource instance and use it for all database queries originating from the associated entity bean.

To deploy such applications against a cluster of partitioned database nodes 102-106, all database queries originating from the application are intercepted and analyze them for the partition node(s) that can answer/execute the query. The queries are intercepted using the FE-RDBMS 202-206. Using the described method, the applications can be automatically and transparently modified to deploy them against the FE-RDBMS 202-206 by dynamically defining an empty database instance in the FE-RDBMS 202-206 whose schema matches the schema of the application database and defining a datasource definition for the same with the JNDI name of the application database and re-naming the JNDI name of the application database to new unique name. This enables the FE-RDBMS 202-206 to 'get' all the application queries without changing the application code and analyze and route them to the database partition node(s) that can execute and answer the query. As part of the application deployment, the FE-RDBMS 202-206 is configured with the database partition topology and using the same, the FE-RDBMS 202-206 partitions, re-generates and route the query (or queries) to the appropriate database partition node(s) using the JDBC interface. If a query spans multiple database partitions, the FE-RDBMS 202-206 generates query fragment for each partition and performs the join on the result of the each partition to compose the final resultset for the application. No code, query generation or deployment support is required from the application provider to enable J2EE application deployment against the partitioned database cluster.

The FE-RDBMS 202-206 analyzes, generates query fragments and joins the results if more than one database partition nodes are involved to execute the query.

The architecture 200 provides transparent support to the J2EE applications to deploy them against the database cluster with partitioned data. The framework transparently routes the application query to the appropriate database partition node that can execute the query. The application does not have to carry any logic or code to work with the partitioned database cluster.

The architecture 200 improves the application and database performance by enabling the application to be deployed against the database partitions.

The architecture 200 enables the J2EE application to be loosely coupled with the database vendor and product and self-provides the support to use the database partitions.

The architecture 200 is suitable for the clustered deployment of the application server and does not have a single point of failure to route the query to the appropriate database partition node.

The query routing logic is deployed with the FE-RDBMS 202-206 which is local to the application and routes the query to the 'right' remote database partition directly. An extra stop to analyze the query is avoided in this architecture 200 which improves the performance besides enabling the J2EE framework to transparently deploy application against the partitioned database cluster.

Combined Solutions

It is possible to combine the two solutions to achieve a cluster consisting of partitioned data sources and each partition having replicas. This will offer second degree of load balancing, availability and performance benefit.

We claim

1. A computer-implemented method of performing web services on a database, said database including a master and a replica instance of said database, said method comprising:

inputting a user request to a URL of a Quality of Service-goal based Router Servlet (QRS), and associating said user request with a thread, wherein said QRS communicates with a session database having a cluster architecture;

assigning, by said QRS, a user identity (UID) to a user session and storing said UID in a session object or reading said UID from said session object;

if said database is marked changed and data in not yet replicated, then adding a database state change flag to said user request, else establishing, by said QRS, a user class and service class from said user request, assigning a Quality of Service (QoS) goal to said user request, and selecting a node from a cluster of nodes that meets said QoS goal, and routing said user request to said selected node;

reading, by a Session Synchronizer Servlet (SSS) of said selected node, said user session using said UID and said database state change flag, if present;

getting, by said SSS, attributes of said session object and setting said attributes from said session object read from said session database, and if said database change state flag is associated with said user request, then adding said database state change flag to said thread;

forwarding, by said SSS, said user request to application logic of said selected node, wherein deployment of an entity bean for read, write, and delete operations and to manage persistent data is re-engineered to enable integration with master and replica database instances by creating a clone entity bean with all of said read and write operations (CEBRW) and a clone entity bean with only said read operations (CEBR);

deploying said CEBRW using a Java Naming and Directory Interface name of an application session bean against a master database instance as an application entity bean, wherein said application session bean interacts with said CEBRW and not with said application entity bean;

intercepting, by said CEBRW, all user requests from said application logic, said CEBRW:

first routing a read request via said CEBR to a replica database instance, if a write flag is not set;

secondly, routing a write request via said application entity bean to a master database instance, if said write flag is set, writing to said master database instance, and time stamping said write request; and thirdly, routing a read request via said application entity bean to said master database instance, if said write flag is set;

then storing, by said SSS, said session object in said session database; caching, by said QRS, said database state change flag in said user session and information related to state changes of said user class by said selected node for routing subsequent user requests to said selected node;

recording, by said QRS, performance of said selected node for said service class; and outputting, by said QRS, a user request result to a user.

2. A system for performing web services on a database, said database including a master and a replica instance of said database, said system comprising:

a memory configured to store:
  a user identity (UID) as a session object in a session database;
  a database state change flag in said user session and information related to state changes of a user class by a selected node for routing subsequent user requests to said selected node, and performance of said selected node for said service class;

a processor configured to:
  perform as a Quality of Service-goal based Router Servlet (QRS) communicating with a session data base having a cluster architecture, said QRS being further configured to:
    receive an inputted user request to a URL of said QRS;
    associate said inputted user request with a thread;
    assign a user identity (UID) to a user session and store said UID in a session object or read said UID from said session object;
    if said database is marked changed and data is not yet replicated, then add a database state change flag to said user request, else establish a user class and service class from said user request, assign a Quality of Service (QoS) goal to said user request, select a node from a cluster of nodes that meets said QoS goal, and route said user request to said selected node;
    read, by session a Synchronizer Servlet (SSS) of said selected node, said user session using said UID and said database state change flag, if present;
    subsequent to read or write operations, cache said database state change flag in said user session and information related to state changes of said user class by said selected node for routing subsequent user requests to said selected node, record performance of said selected node for said service class; and output a user request result to a user;
  perform as a Session Synchronizer Servlet (SSS) of said selected node, said SSS being further configured to:
    read said user session using said UID;
    get attributes of said session object and set said attributes from said session object read from said session database, and if said database change state flag is associated with said user request, then add said database state change flag to said thread;
    forward said user request to application logic of said selected node; and
    subsequently store, after read or write operations, said session object in said session database;
  perform as a clone entity bean with read and write operations (CEBRW) and a clone entity bean with only read operations (CEBR),
  wherein deployment of an entity bean for read, write, and delete operations and to manage persistent data is re-engineered to enable integration with master and replica database instances by creating said CEBRW with all of said read and write operations and said CEBR with only said read operations,
  wherein said CEBRW is deployed using a Java Naming and Directory Interface name of an application session bean against a master database instance as an application entity bean,
  wherein said application session bean interacts with said CEBRW and not with said application entity bean;
  wherein said CEBRW intercepts all user requests from said application logic, said CEBRW:
    first routing a read request via said CEBR to a replica database instance, if a write flag is not set;
    secondly, routing a write request via said application entity bean to a master database instance, if said write flag is set, writing to said master database instance, and time stamping said write request; and
    thirdly, routing a read request via said application entity bean to said master database instance, if said write flag is set.

3. A computer program storage medium readable by computer, tangibly embodying a program of instructions executable by said computer to perform a method of performing web services on a database having a cluster architecture, said database including a master and a replica instance of said database, said method comprising:

inputting a user request to a URL of a Quality of Service-goal based Router Servlet (QRS), and associating said user request with a thread, wherein said QRS communicates with a session database having a cluster architecture;

assigning, by said QRS, a user identity (UID) to a user session and storing said UID in a session object or reading said UID from said session object;

if said database is marked changed and data in not yet replicated, then adding a database state change flag to said user request, else establishing, by said QRS, a user class and service class from said user request, assigning a Quality of Service (QoS) goal to said user request, and selecting a node from a cluster of nodes that meets said QoS goal, and routing said user request to said selected node;

reading, by a Session Synchronizer Servlet (SSS) of said selected node, said user session using said UID and said database state change flag, if present;

getting, by said SSS, attributes of said session object by reading and setting said attributes from said session object read from said session database, and if said database change state flag is associated with said user request, then adding said database state change flag to said thread;

forwarding, by said SSS, said user request to application logic of said selected node, wherein deployment of an entity bean for read, write, and delete operations and to manage persistent data is re-engineered to enable integration with master and replica database instances by creating a clone entity bean with all of said read and write operations (CEBRW) and a clone entity bean with only said read operations (CEBR);

deploying said CEBRW using a Java Naming and Directory Interface name of an application session bean against a master database instance as an application entity bean, wherein said application session bean interacts with said CEBRW and not with said application entity bean;

intercepting, by said CEBRW, all user requests from said application logic, said CEBRW:

first routing a read request via said CEBR to a replica database instance, if a write flag is not set;

secondly, routing a write request via said application entity bean to a master database instance, if said write flag is set, writing to said master database instance, and time stamping said write request; and thirdly, routing a read request via said application entity bean to said master database instance, if said write flag is set;

then storing, by said SSS, said session object in said session database;

caching, by said QRS, said database state change flag in said user session and information related to state changes of said user class by said selected node for routing subsequent user requests to said selected node;

recording, by said QRS, performance of said selected node for said service class; and outputting, by said QRS, a user request result to a user.

* * * * *